(12) United States Patent
Ramlall

(10) Patent No.: US 8,773,305 B1
(45) Date of Patent: Jul. 8, 2014

(54) METHOD FOR DOPPLER-AIDED GPS CARRIER-TRACKING USING P-STEP RAMP UNBIASED FINITE IMPULSE RESPONSE PREDICTOR

(75) Inventor: Rohan Yash Ramlall, Brentwood, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 351 days.

(21) Appl. No.: 13/440,885

(22) Filed: Apr. 5, 2012

(51) Int. Cl.
*G01S 19/42* (2010.01)
(52) U.S. Cl.
USPC .................................................. 342/357.68
(58) Field of Classification Search
CPC ........................................................ G01S 19/42
USPC ........................................................ 342/357.68
See application file for complete search history.

(56) References Cited

U.S. PATENT DOCUMENTS

2011/0169689 A1* 7/2011 Wang et al. ................. 342/357.3
2012/0229335 A1* 9/2012 Van Diggelen et al. . 342/357.42

OTHER PUBLICATIONS

M. Lashley, "Kalman Filter Based Tracking Algorithms for Software GPS Receivers," M.S. Thesis, Dept. Mech. Eng., Auburn Univ., AL, 2006.

T.Y. Chiou, J. Seo, T. Walter, P. Enge, "Performance of a Doppler-Aided GPS Navigation System for Aviation Applications under Ionospheric Scintillation," in Proc. ION GNSS 2008, Savannah, GA, Sep. 2008, pp. 1139-1147.
P. D. Groves, D. C. Long, "Inertially-Aided GPS Signal Re-Acquisition in Poor Signal to Noise Environments and Tracking Maintenance Through Short Signal Outages," Proc. ION GNSS 2005, Long Beach, CA, Sep. 2005, pp. 2408-2417.
Y. Shmaliy, L. Arceo-Miquel, "Efficient predictive estimator for holdover in GPS-based clock synchronization," Ultrasonics, Ferroelectrics and Frequency Control, IEEE Transactions on , vol. 55 No. 10, pp. 2131-2139, Oct. 2008.
Shmaliy, Y.S., "Linear Unbiased Prediction of Clock Errors," Ultrasonics, Ferroelectrics and Frequency Control, IEEE Transactions on, vol. 56, No. 9, pp. 2027-2029, Sep. 2009.

* cited by examiner

*Primary Examiner* — Harry Liu
(74) *Attorney, Agent, or Firm* — SPAWAR System Center Pacific; Kyle Eppele; J. Eric Anderson

(57) ABSTRACT

A GPS carrier-tracking method comprising: acquiring a GPS signal from a satellite with a receiver in acquisition mode when the signal strength of the GPS signal is equal to or above a carrier/noise ($C/N_0$) threshold; tracking the carrier frequency of the GPS signal while the receiver in a tracking mode when the signal strength of the GPS signal is above the $C/N_0$ threshold; recording carrier frequency values while the receiver is in tracking mode; predicting a current Doppler shift based on the recorded values when the signal strength of the GPS signal drops below the $C/N_0$ threshold for a time period t; and resuming, without the receiver re-entering acquisition mode, tracking of the GPS signal after time t and once the signal strength of the GPS signal is again equal to or above the $C/N_0$ threshold, wherein the resumed tracking is based on the predicted Doppler shift.

12 Claims, 5 Drawing Sheets

US 8,773,305 B1

METHOD FOR DOPPLER-AIDED GPS CARRIER-TRACKING USING P-STEP RAMP UNBIASED FINITE IMPULSE RESPONSE PREDICTOR

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 101149.

BACKGROUND OF THE INVENTION

A global positioning system (GPS) receiver acquires and then tracks a GPS signal. After acquiring the GPS signal while in an acquisition mode, the GPS receiver then operates in a tracking mode where the carrier frequency and code phase of the signal are estimated using the Costas Loop and Delay Lock Loop, respectively. The power level of a GPS signal is typically very low (−130 dBm), which makes the signal susceptible to jamming or environmental blockage. When the carrier power-to-noise density ($C/N_0$) of the GPS signal drops below a threshold level the receiver is forced to exit tracking mode. Once the $C/N_0$ ratio of the GPS signal again exceeds the threshold the receiver must re-enter acquisition mode to reacquire the GPS signal.

Furthermore, the carrier tracking loop can lose lock due to user dynamics, unless the loop's order is greater than two, which is not unconditionally stable. Doppler-aiding refers to techniques that provide an estimate of the Doppler shift to the carrier tracking loop. There are two traditional Doppler-aiding solutions: 1) vector processing and 2) integration of GPS with an inertial measurement unit (IMU). Vector processing estimates the Doppler shift in the weak (low $C/N_0$) tracking channel by using the stronger channels. However, this method only works if at least four channels with high $C/N_0$ values are available. The integration of GPS with an IMU involves the integration of inertial sensors in a tight integration scheme using the extended Kalman filter. However, without high quality, expensive sensors, the deep integration method is not viable for periods of GPS outages more than tens of seconds. Also, due to the inherent nature of the Kalman filter, accurate modeling of the error sources is required. There exists a need for an accurate, cost-effective means of predicting the Doppler shift in GPS receivers.

SUMMARY

Disclosed herein is a global positioning system (GPS) carrier-tracking method comprising several steps. First, the method requires the step of acquiring a GPS signal from a satellite with a receiver. The next step provides for tracking the carrier frequency of the GPS signal with the receiver. The third step provides for recording carrier frequency values while the receiver is in tracking mode. The fourth step provides for exiting tracking mode and predicting a current Doppler shift based on the recorded values when the signal strength of the GPS signal at the receiver drops below a $C/N_0$ threshold. The fifth step provides for resuming, without the receiver re-entering acquisition mode, tracking of the GPS signal based on the predicted Doppler shift.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
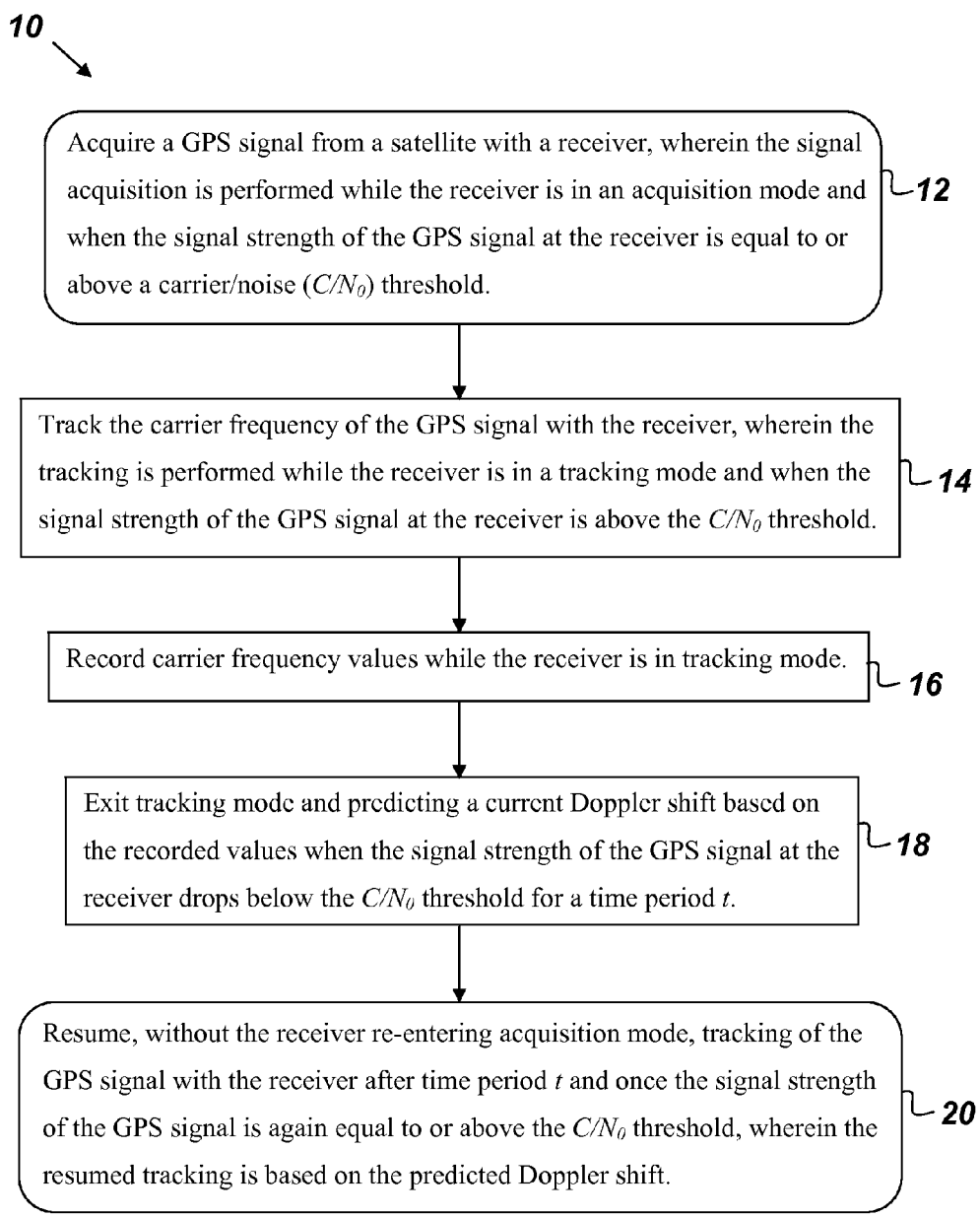
FIG. 1 is a flowchart of a method for GPS carrier-tracking.

FIG. 1 is a flowchart showing the steps of a global positioning system (GPS) carrier-tracking method 10 capable of predicting the Doppler shift in GPS receivers to enable tracking of the carrier frequency after time intervals where the GPS signal is unavailable without the receiver reverting back to acquisition mode. The first step 12 provides for acquiring a GPS signal from a satellite with a receiver. The signal acquiring is performed while the receiver is in an acquisition mode and while the signal strength of the GPS signal at the receiver is equal to or above a carrier/noise ($C/N_0$) threshold. The second step 14 provides for tracking the carrier frequency of the GPS signal with the receiver. The tracking is performed while the receiver is in a tracking mode and while the signal strength of the GPS signal at the receiver is above the $C/N_0$ threshold. The third step 16 provides for recording carrier frequency values while the receiver is in tracking mode. The fourth step 18 provides for exiting tracking mode and predicting a current Doppler shift based on the recorded values when the signal strength of the GPS signal at the receiver drops below the $C/N_0$ threshold for a time period t. Once the signal strength of the GPS signal is again equal to or above the $C/N_0$ threshold, the fifth step 20 provides for resuming, without the receiver re-entering acquisition mode, tracking of the GPS signal with the receiver after time period t. The resumed tracking is based on the predicted Doppler shift.

Any type of GPS receiver may be used with the GPS carrier-tracking method 10. The purpose of acquisition mode is for the receiver to determine the pseudorandom noise (PRN) code offset and received carrier frequency of the GPS signal. Depending on the sensitivity of the receiver ($C/N_0$) and the number of satellites in view, it can take minutes for the GPS receiver to acquire a GPS signal.

One method of tracking the carrier frequency of the GPS signal is by using a phase-locked loop, such as a Costas loop. The Costas loop is a phase-locked loop that multiplies the in-phase and quadrature-phase outputs from a numerically controlled oscillator (NCO) with the baseband GPS signal and sends the results to a phase discriminator. The phase discriminator estimates the phase error which is provided to a loop filter whose output adjusts the frequency of the NCO. When the phase error is zero, the carrier frequency is being tracked. The Costas loop may be used by GPS receivers to track the carrier frequency because it is unaffected by the binary phase-shift keying (BPSK) modulation of the GPS signal. The Costas loop's ability to "lock" on to the frequency of the GPS signal, given an initial frequency error, is called the pull-in range. If the frequency error is larger than the Costas loop's pull-in range, the loop will not lock on to the carrier frequency. The pull-in range of the typical Costas loop used in GPS receivers is approximately 3-30 Hz.

While the receiver is in tracking mode, the current carrier frequency values are recorded in an array data structure to be used later by the predictor. Any type of predictor, both linear and non-linear, may be used with the GPS carrier-tracking method 10.

As used herein, the term "Doppler shift" refers to the shift in the received frequency of the GPS signal relative to the transmitted frequency of the GPS signal caused by the relative movement between the transmitter and/or receiver in a communication system. This phenomenon can be described by the following equation:

$$v = -\frac{\mu}{c}\cos\gamma \quad (1)$$

where $v$ is the Doppler shift, $\gamma$ is the angle between the velocity and wave propagation vectors, $\mu$ is the speed that the transmitter and receiver are moving relative to each other, and $c$ is the speed of light.

Figure 2A:
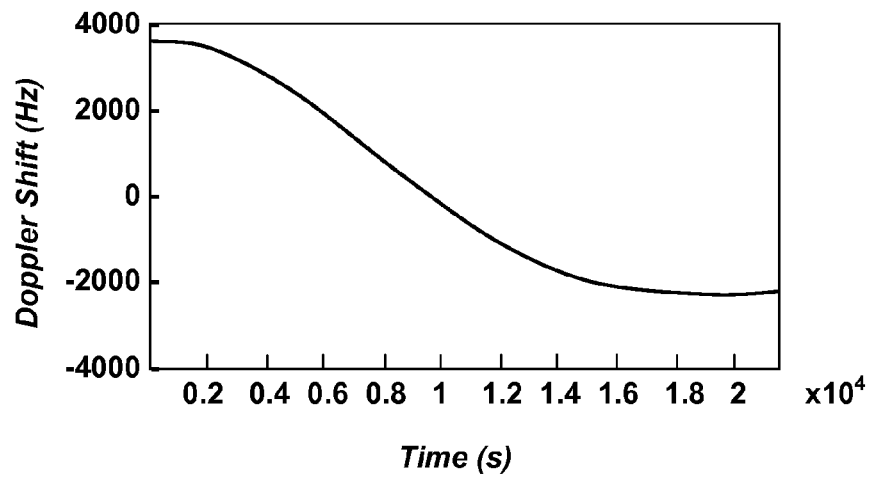
FIGS. 2A and 2B are plots of Doppler shift data over time.
Figure 2B:
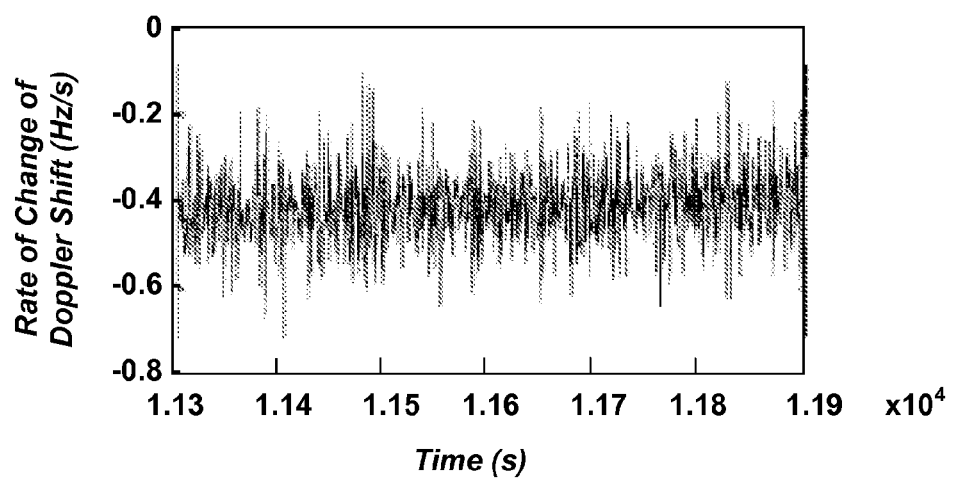

FIGS. 2A-2B are plots depicting the Doppler data collected over the period of six hours (slightly more than 1¼ sidereal day which is the orbital period of each satellite) from a GPS satellite using a GPS simulator and a stationary software receiver. FIG. 2A is a plot of the receiver's Doppler shift estimate of a GPS signal over time. FIG. 2B is a plot of the rate of change of the Doppler shift over time. From FIG. 2B, which shows the derivative of the receiver's Doppler shift estimate, one can see that the change in Doppler shift is somewhat constant over time intervals of approximately ten minutes, and therefore predictable.

Figure 3:
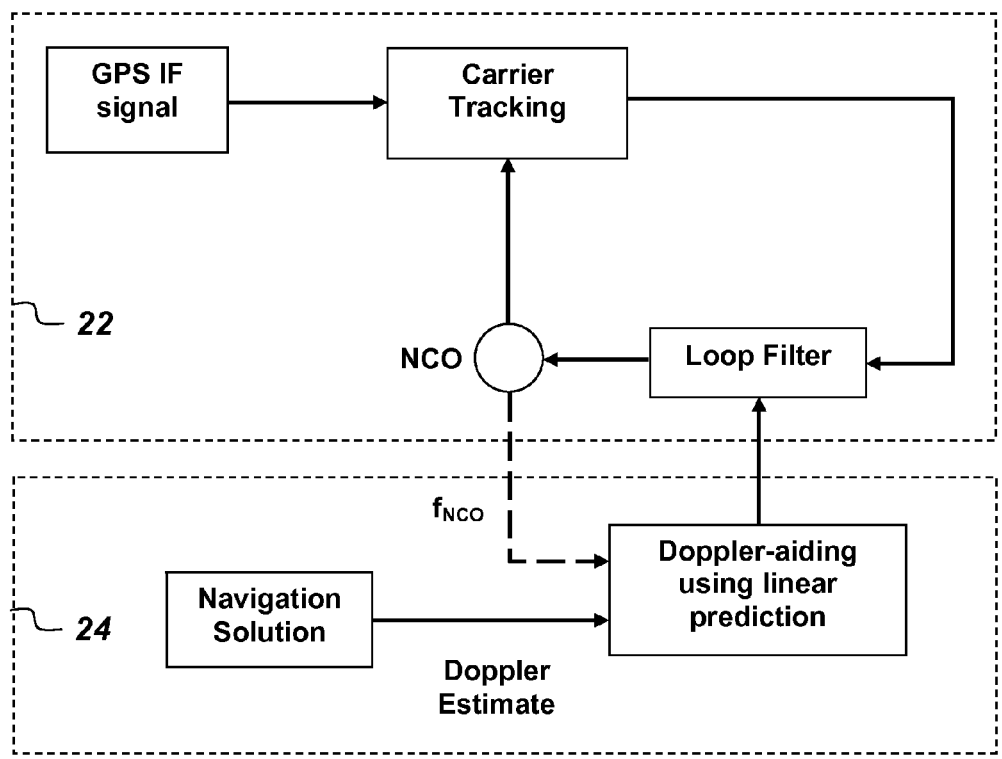
FIG. 3 is a graphical illustration of the GPS carrier-tracking method.

FIG. 3 is a graphical representation showing how tracking method 10 works in a software defined GPS receiver. The upper portion 22, shown in FIG. 3, corresponds to the first and second steps 12 and 14. The lower portion 24 is representative of the third, fourth, and fifth steps 16, 18, and 20. While the receiver is in tracking mode, the estimate of the Doppler shift from the navigation solution is input to a tap vector. Upon tracking loss, the predictor uses the tap input of previous Doppler estimates to predict the current Doppler shift. Once the GPS signal is available again, the predictor provides its Doppler estimate to the NCO, which resumes tracking as long as the estimate is within the pull-in rage of the Costas Loop. Thus, tracking method 10 avoids having the receiver revert back to acquisition mode to search for the Doppler shift and then reenter tracking mode.

One way of predicting the Doppler shift based on the recorded values is through the use of a p-step ramp unbiased finite impulse response predictor (hereinafter referred to as Predictor A). Predictor A may be used to effectively predict time interval errors in the case of holdover algorithms where the prediction intervals span several hours, even days. A finite form of Predictor A is given below by:

$$x_{n+p} = \Sigma_{k=0}^{L} h_{kn} x_{n-k}$$

where x represents recorded carrier frequencies obtained while the receiver is in tracking mode, h represents filter coefficients, n is a sampling number index, p is a prediction number index that is greater than zero, k is an indexing variable, and L is a filter order and the length of the input vector. The value $h_{kn}$ is defined as:

$$h_{kn} = 2\frac{2n^2 + n(1+3p) - 3k(n+2p)}{n(n+1)(n+2)}. \quad (3)$$

Two of the key advantages of Predictor A are its bounded-input bounded-output (BIBO) stability and its ease of use. Since Predictor A is a finite impulse response (FIR) filter, it is inherently stable. Furthermore, it does not require any information besides the tap inputs. As seen from equation (3), Predictor A's coefficients are deterministic; thus Predictor A can also be implemented in hardware as shown by the dashed line in FIG. 3. The frequency of the NCO is stored in one of the software-defined radio's hardware registers. A field programmable gate array (FPGA) or digital signal processor (DSP) can read this register directly and input the value into the tap vector (as opposed to the Doppler shift estimate coming from the navigation solution at the software level). By not re-entering acquisition mode, the receiver quickly resumes tracking of the GPS signal without having to search the entire Doppler frequency range +/-10 kHz.

Figure 4:
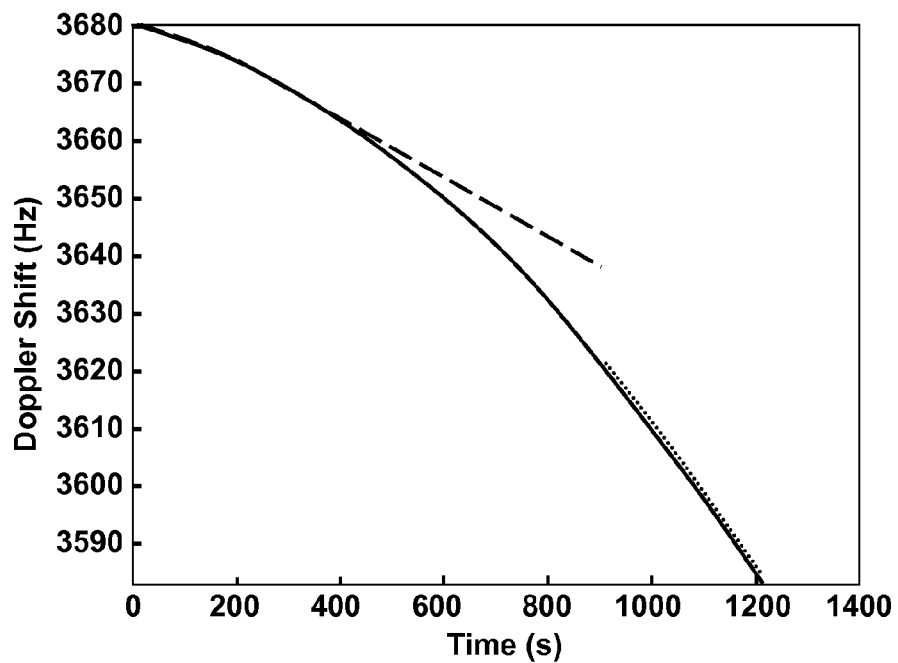
FIG. 4 is a plot of Doppler shift data for a stationary receiver.

FIG. 4 is a plot showing the Doppler data for a stationary GPS receiver collected from a GPS satellite. During the twenty minutes during which the Doppler data in FIG. 4 was collected, the stationary receiver was located at a first position. The L1 carrier frequency was jammed for ten minutes, five minutes into the test. The solid curve represents the true Doppler shift, the dotted curve represents the receiver's estimate of the Doppler shift, and the long-dashed curve shows the predicted Doppler shift using an input vector length of five. By the end of the ten minute prediction interval, the prediction error is only 16 Hz, which is well within the pull-in range of the Costas loop.

Figure 5:
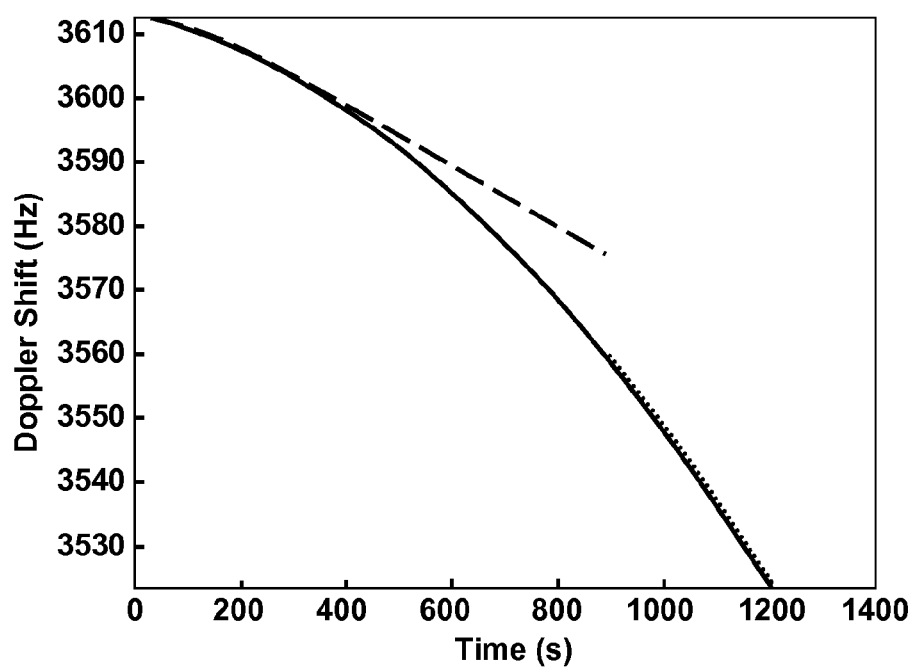
FIG. 5 is a plot of Doppler shift data for a mobile receiver.

FIG. 5 is a plot showing the Doppler data for a mobile GPS receiver collected from the same satellite as in the scenario depicted in FIG. 4. During the twenty minutes during which the Doppler data in FIG. 5 was collected, the mobile receiver started from the first position and then moved northward with a constant velocity of 13.41 m/s. The L1 carrier frequency was jammed for ten minutes, five minutes into the test. The input vector length that yielded the lowest Doppler error at the end of the ten minute interval was determined through post processing of the data. The solid curve represents the true Doppler shift, the dotted curve is the receiver's estimate of the Doppler shift, and the long-dashed curve shows the predicted Doppler shift using an input vector length of ten. By the end of the ten minute prediction interval, the prediction error is only 15 Hz, which is also well within the pull-in range of the Costas loop. In both scenarios depicted in FIGS. 4 and 5, the receiver loses lock on the carrier frequency and reverts back to acquisition mode, which explains the lack of receiver Doppler estimates during the jamming interval. A conventional GPS receiver was used to collect the Doppler data shown in FIGS. 2, 4, and 5. The GPS carrier-tracking method was demonstrated by post-processing the Doppler data and analyzing the results.

This GPS carrier-tracking method 10 is simple in complexity and requires no additional tracking channels, additional sensors, or models which are needed by the other means of Doppler aiding. The GPS carrier-tracking method 10 is capable of predicting the Doppler shift over the period on the order of tens of minutes, while staying within the pull-in range of the Costas loop typically used in GPS receivers. This enables carrier tracking to resume (once the GPS signal is available) without having to reacquire the signal and without tight integration with a costly navigation grade inertial measurement unit.

From the above description of the tracking method 10, it is manifest that various techniques may be used for implementing the concepts of method 10 without departing from its scope. The described embodiments are to be considered in all respects as illustrative and not restrictive. It should also be understood that method 10 is not limited to the particular embodiments described herein, but is capable of many embodiments without departing from the scope of the claims.

What is claimed is:

1. A global positioning system (GPS) carrier-tracking method comprising the following steps:
    acquiring a GPS signal from a satellite with a receiver, wherein the signal acquiring is performed while the receiver is in an acquisition mode and when the signal strength of the GPS signal at the receiver is equal to or above a carrier/noise ($C/N_0$) threshold;
    tracking the carrier frequency of the GPS signal with the receiver, wherein the tracking is performed while the receiver is in a tracking mode and when the signal strength of the GPS signal at the receiver is above the $C/N_0$ threshold;
    recording carrier frequency values while the receiver is in tracking mode;
    exiting tracking mode and predicting a current Doppler shift based on the recorded values when the signal strength of the GPS signal at the receiver drops below the $C/N_0$ threshold for a time period t; and
    resuming, without the receiver re-entering acquisition mode, tracking of the GPS signal with the receiver after time period t and once the signal strength of the GPS signal is again equal to or above the $C/N_0$ threshold, wherein the resumed tracking is based on the predicted Doppler shift.

2. The method of claim 1, wherein the step of predicting a current Doppler shift is performed by using a linear predictor.

3. The method of claim 2, wherein the linear predictor is a P-step ramp unbiased finite impulse response predictor.

4. The method of claim 3, wherein the step of resuming tracking without re-entering acquisition mode only occurs if a frequency error of the carrier signal is within a desired frequency range.

5. The method of claim 4, wherein the desired frequency range is approximately 3-30 Hz.

6. The method of claim 3, wherein the time period t is at least 10 minutes.

7. The method of claim 2, wherein the step of tracking the carrier frequency of the GPS signal is performed by using a Costas loop.

8. The method of claim 2, wherein the GPS receiver is software defined.

9. The method of claim 2, wherein the predictor is implemented in hardware in the GPS receiver.

10. The method of claim 3, wherein the predictor takes the form of:

$$x_{n+p} = \sum_{k=0}^{L} h_{kn} x_{n-k}$$

where x represents recorded carrier frequencies obtained while the receiver is in tracking mode, h represents filter coefficients, n is a sampling number index, p is a prediction number index, k is an indexing variable, and L is a filter order, and wherein $h_{kn}$ is defined as:

$$h_{kn} = 2\frac{2n^2 + n(1+3p) - 3k(n+2p)}{n(n+1)(n+2)}.$$

11. The method of claim 9, wherein the predictor is implemented in a field programmable gate array (FPGA).

12. The method of claim 9, wherein the predictor is implemented in a digital signal processor, wherein a frequency of a numerically controlled oscillator (NCO) within the receiver is measured directly and used to predict the Doppler shift.

* * * * *